United States Patent
Myers

Patent Number: 5,878,084
Date of Patent: Mar. 2, 1999

[54] METHOD AND APPARATUS FOR RECOVERING THE INDEPENDENT BIT STREAMS FROM EACH OF TWO CO-CHANNEL FREQUENCY MODULATED CARRIERS

[76] Inventor: Glen A. Myers, 279 Laureles Grade Rd., Salina, Calif. 93908

[21] Appl. No.: 705,721

[22] Filed: Aug. 30, 1996

[51] Int. Cl.$^6$ ............................. H03K 7/06; H03K 9/06
[52] U.S. Cl. ..................... 375/271; 375/302; 375/322
[58] Field of Search ...................... 375/260, 271, 375/295, 302, 316, 322, 340, 324; 329/315, 316; 332/117, 119; 455/142, 205; 370/318, 319, 329, 330, 480, 436

[56] References Cited

U.S. PATENT DOCUMENTS

| | | | |
|---|---|---|---|
| 4,859,958 | 8/1989 | Myers | 329/112 |
| 4,992,747 | 2/1991 | Myers | 329/316 |
| 5,038,115 | 8/1991 | Myers | 331/2 |
| 5,329,242 | 7/1994 | Myers | 329/300 |
| 5,610,948 | 3/1997 | Ninomiya et al. | 375/324 |

Primary Examiner—Tesfaldet Bocure
Attorney, Agent, or Firm—Patrick T. King

[57] ABSTRACT

Method and apparatus for recovering in a receiver of a wireless communications system independent bit streams from each of two co-channel frequency modulated carriers. In the transmitter, timing for the two independent bit streams is derived from a common clock. One bit stream is placed directly on the carrier of greater power. An XOR circuit maps the two bit streams into one bit stream which is placed on the carrier of lesser power. In the receiver, an ordinary frequency demodulator provides an output consisting of the bit stream of the dominant carrier having superimposed voltage spikes. A limiter removes the spikes and provides as output the bit stream on the carrier of greater power. The peak value and the rate of occurrence of the spikes each contain information about the bit stream on the carrier of lesser power. A peak voltage detector provides an output signal which indicates the differences in the peak value of the spikes. A peak rate detector provides an output signal which indicates the rate of occurrence of the spikes. A comparator distinguishes the two peak values present and provides as an output the bit stream on the carrier of lesser power. In this manner, the two bit streams are recoverable by the operation of a series connected frequency demodulator and a peak voltage or peak rate detector.

25 Claims, 10 Drawing Sheets

METHOD AND APPARATUS FOR RECOVERING THE INDEPENDENT BIT STREAMS FROM EACH OF TWO CO-CHANNEL FREQUENCY MODULATED CARRIERS

GOVERNMENT RIGHTS

This invention was made with Government support under Prime Contract Number DAAB07-94-D-D604 awarded by the United States Army. The United States Government has certain rights to this invention.

TECHNICAL FIELD

The present invention generally relates to the removal of interference in electrical circuits, and, more particularly, to using frequency information to provide an indication in real time of the independent bit streams carried by each of two individual modulated sinusoids occupying the same frequency band.

BACKGROUND OF THE INVENTION

Bit streams conveying sequences of binary words are used to represent a variety of message forms. These include sensor outputs, text, audio signals, video signals. In many applications, wireless communications is the preferred form of transmitting these bit streams from a source to a user. Wireless communications uses sinusoids as propagating waves. These sinusoids are modulated by the bits in the stream. In this way, the bits are carried by the propagating wave. A common form of modulation involves variation of the frequency of the sinusoid to create frequency modulation (FM), sometimes referred to as frequency shift keying (FSK) when the bits in the stream are distinguished by two or more voltage levels.

In all forms of carrier modulation, an increase in the rate at which the bits are sent requires an increase in the bandwidth of the modulated sinusoidal carrier. The proliferation of the use of bit streams to convey messages creates ever increasing demands for additional spectrum (bandwidth).

It has been demonstrated that it is possible to recover messages from each of two or more co-channel FM carriers. This provides a spectrum reuse capability. Circuits previously developed as demodulators of each of two co-channel FM carriers can be used when the message is analog or when the message is a digital bit stream. Consequently, these circuits do not utilize prior information available in the bit stream format. Further, these general purpose circuits require adjustment when parameters of the communication system vary. Therefore, there is a need to develop receiving systems which are simple and robust for the important case of independent bit streams as messages on each of two co-channel carriers.

U.S. Pat. Nos. 4,859,958 and 4,992,747, invented by Glen A. Myers, the inventor of the present invention, are each incorporated by reference in the present application as though fully set forth herein. In these patents, a means for demodulating all of several FM carriers is described.

U.S. Pat. No. 5,038,115, co-invented by the inventor of the present invention, is also incorporated by reference in the present application as though fully set forth herein. In this patent, phase tracking of input terminal signals is described. In one embodiment of the phase tracking circuit of U.S. Pat. No. 5,038,115, a phase tracking circuit makes use of two phase-locked loops electrically connected in a feed forward manner.

U.S. Pat. No. 5,329,242 invented by the inventor of the present invention, is also incorporated by reference as though fully set forth herein. In this patent, demodulating a frequency modulated signal using the time intervals between zero crossings of a received carrier signal is described. Averaging and mapping techniques are used to improve estimates of the message signal.

U.S. patent application 08/214,378 by the inventor of the present invention is also incorporated by reference as though fully set forth herein. This application describes, analytically and geometrically, the effect of adding two sinusoids of different frequency.

U.S. patent application 5,541,959 by the inventor of the present invention is also incorporated by reference as though fully set forth herein. In this patent are described a method and apparatus for creating a replica of a dominant carrier.

U.S. patent application 5,554,955 by the inventor of the present invention is also incorporated by reference as though fully set forth herein. This patent describes method and apparatus for removing the effects of co-channel interference from the message on a dominant frequency modulated carrier and for recovering the message from each of two co-channel carriers. The messages can have analog or digital formats.

There is a need for a technique which can use only the output of any type of frequency demodulator to recover independent bit streams from each of two frequency modulated co-channel carriers.

SUMMARY OF THE INVENTION

The present invention relates to a method and apparatus for recovering the independent bit streams from each of two co-channel frequency modulated carriers, where the carriers are separated in power level. The carrier having the greater power experiences the greater value of peak frequency deviation.

In accordance with one preferred embodiment of the present invention, the two independent bit streams are clocked from a common reference in a transmitter. This aligns in time the voltage transition opportunities of the bits in the two bit streams. It is necessary, then, that the bit rate of one stream be an integer multiple of the bit rate of the other. Demodulation and clock recovery in the receiver are facilitated in this manner. One bit stream modulates the sinusoid having the greater power. The two bit streams are mapped to a single bit stream using a logical exclusive OR (XOR) operation. The bit stream appearing at the output of the XOR gate modulates the weaker sinusoid. The modulated sinusoids are added, or combined, to create a single power-multiplexed carrier which is then amplified and transmitted in an ordinary manner. The receiver consists of ordinary antenna, amplification, frequency conversion and filter circuitry. The demodulator is any type of frequency demodulator. The output of the frequency demodulator is applied to a hard limiter. The output of the hard limiter is the bit stream on the modulated sinusoid with the greater power. When the input data signals are different, more beat spikes per bit re obtained at greater amplitude. When the input data signals are the same, fewer beat spikes per bit are obtained at smaller amplitude. Therefore, measurement of either the rate of the voltage spikes or the amplitude of the voltage spikes will obtain the bit stream on the weaker carrier.

The peak values of the voltage 'spikes' superimposed on the bit stream carried by the stronger sinusoid have two levels and are detected with a peak voltage detector circuit. The frequency, or rate, of the spikes are alternatively detected to obtain two levels. The resulting two-level detection is the second bit stream which was applied to the XOR gate in the transmitter. In this manner, two independent bit streams are recovered from a single composite power-multiplexed sinusoidal carrier.

The ability to control the sharing between two carriers available transmitter output power provides a means of controlling at the receiver output the quality of one bit stream at the expense of the quality of the other. Quality is commonly measured as a percentage of bits in error or the ratio of the number of bits received in error to the total number of bits transmitted which is bit error ratio (BER).

The present invention provides a system for transmitting and receiving independent bit streams from each of two co-channel frequency-modulated carriers. The system includes a transmitter having a first frequency modulator for receiving a first input bit stream and for providing a first sinusoidal signal which is frequency modulated by the first input bit stream. The transmitter also includes a second frequency modulator for receiving a second input bit stream and providing a second sinusoidal signal which is frequency modulated by the second input bit stream. The power of the first sinusoidal signal is greater than the power of the second sinusoidal signal. A signal summer, or combiner, sums together the frequency-modulated output signal of the first frequency modulator and the frequency-modulated output signal of the second frequency modulator.

The system also includes a receiver having a frequency demodulator for receiving a replica of the output signal of the signal combiner and for providing a frequency-demodulated output signal. A limiter is coupled to the output terminal of the frequency demodulator and provides an output signal corresponding to the first input bit stream. A full-wave rectifier receives the frequency-demodulated signal and provides a full-wave rectified output signal. A peak voltage/spike rate detector receives the full-wave rectified output signal and provides voltage levels corresponding to the peak amplitude or rate values at its input. A comparator has a first input terminal with a reference voltage coupled thereto and has a second terminal coupled to the output terminal of the peak voltage/spike rate detector. The comparator has an output terminal at which is provided an output signal corresponding to the second input bit stream.

The receiver allows two independent input bit streams to be recovered from a transmitted composite power-multiplexed sinusoidal carrier.

In one preferred embodiment of the invention, the transmitter includes an exclusive—or (XOR) for logically combining the first and second input bit streams, where the exclusive—or combination of the first and the second input bit streams modulates the second carrier. The input bit streams can be clocked from a common timing reference signal in the transmitter. The first and second input bit streams can have data rates which are integer multiples of each other.

One preferred embodiment of the full-wave rectifier includes an analog voltage multiplier having one input terminal coupled to the output terminal of the frequency demodulator and having another input terminal coupled to the output terminal of the limiter, said full-wave rectifier having an output terminal. This preferred embodiment also includes a peak voltage detector having an input terminal coupled to the output terminal of the analog voltage multiplier, said peak voltage detector having an output terminal connected to the second input terminal of a comparator.

The additive combination provided by the summer, or combiner, in the transmitter is a sinusoid with an instantaneous frequency $F(t)=m_d(t)+r[m_d(t)-m_s(t)][g(r,\phi)]$, where $r=A_s/A_d$, $A_s$=peak amplitude of the subdominant (weaker) carrier, $A_d$=peak amplitude of the dominant (stronger) carrier, $\phi(t)=\theta_d(t)-\theta_s(t)$, $\theta_d(t)$=phase variation of the dominant carrier due to its message, $\theta_s(t)$=phase variation of the subdominant carrier due to its message, $m_d(t)=(1/2\pi)[d\theta_d(t)/dt]$=message carried by the dominant sinusoid, $m_s(t)=(1/2\pi)[d\theta_s(t)/dt]$=message carried by the subdominant sinusoid, $g(r,\phi)=-\{r\cdot[r+\cos\phi(t)]/[1+r^2+2r\cos\phi(t)]\}$.

BRIEF DESCRIPTION OF THE DRAWINGS

The accompanying drawings which are incorporated in and form a part of this specification, illustrate embodiments of the invention and, together with the description, serve to explain the principles of the invention.

DETAILED DESCRIPTION OF THE PREFERRED EMBODIMENT

In U.S. Pat. No. 5,554,955 by the inventor of the present invention, which is incorporated by reference as though fully set forth herein, the inventor of the present invention describes analytically the effect of adding two sinusoids of different frequency. The additive combination is another sinusoid having amplitude and frequency which change with time. The exact relationships for the envelope or peak amplitude variations $E(t)$ and the instantaneous frequency deviation $F(t)$ from the value of carrier frequency are shown to be:

$$E(t)=A_d[1+r^2+2r\cos\phi(t)]^{1/2} \qquad (1)$$

and $$F(t)=(A_d)^2\cdot[D\cdot m_d(t)+S\cdot m_s(t)] \qquad (2);$$

where:

$r = A_s/A_d$;

$A_s$ = peak amplitude of the subdominant (weaker) carrier;

$A_d$ = peak amplitude of the dominant (stronger) carrier;

$\phi(t) = \theta_d(t) - \theta_s(t)$;

$\theta_d(t)$ = phase variation of the dominant carrier due to its message;

$\theta_s(t)$ = phase variation of the subdominant carrier due to its message;

$D = [1 + r \cdot \cos \phi(t)]/E^2(t)$;

$S = \{r \cdot [r + \cos \phi(t)]\}/E^2(t)$;

$m_d(t) = (\frac{1}{2}\pi)[d\theta_d(t)/dt]$ = message carried by the dominant sinusoid; and $m_s(t) = (\frac{1}{2}\pi)[d\theta_s(t)/dt]$ = message carried by the subdominant sinusoid.

The form of F(t) in equation (2) can be rewritten as $$F(t) = m_d(t) + r[m_d(t) - m_s(t)][g(r, \phi)] \quad (3);$$

where:

$$g(r, \phi) = -\{r \cdot [r + \cos \phi(t)]/[1 + r^2 + 2r \cos \phi(t)]\}. \quad (4)$$

Figure 1:
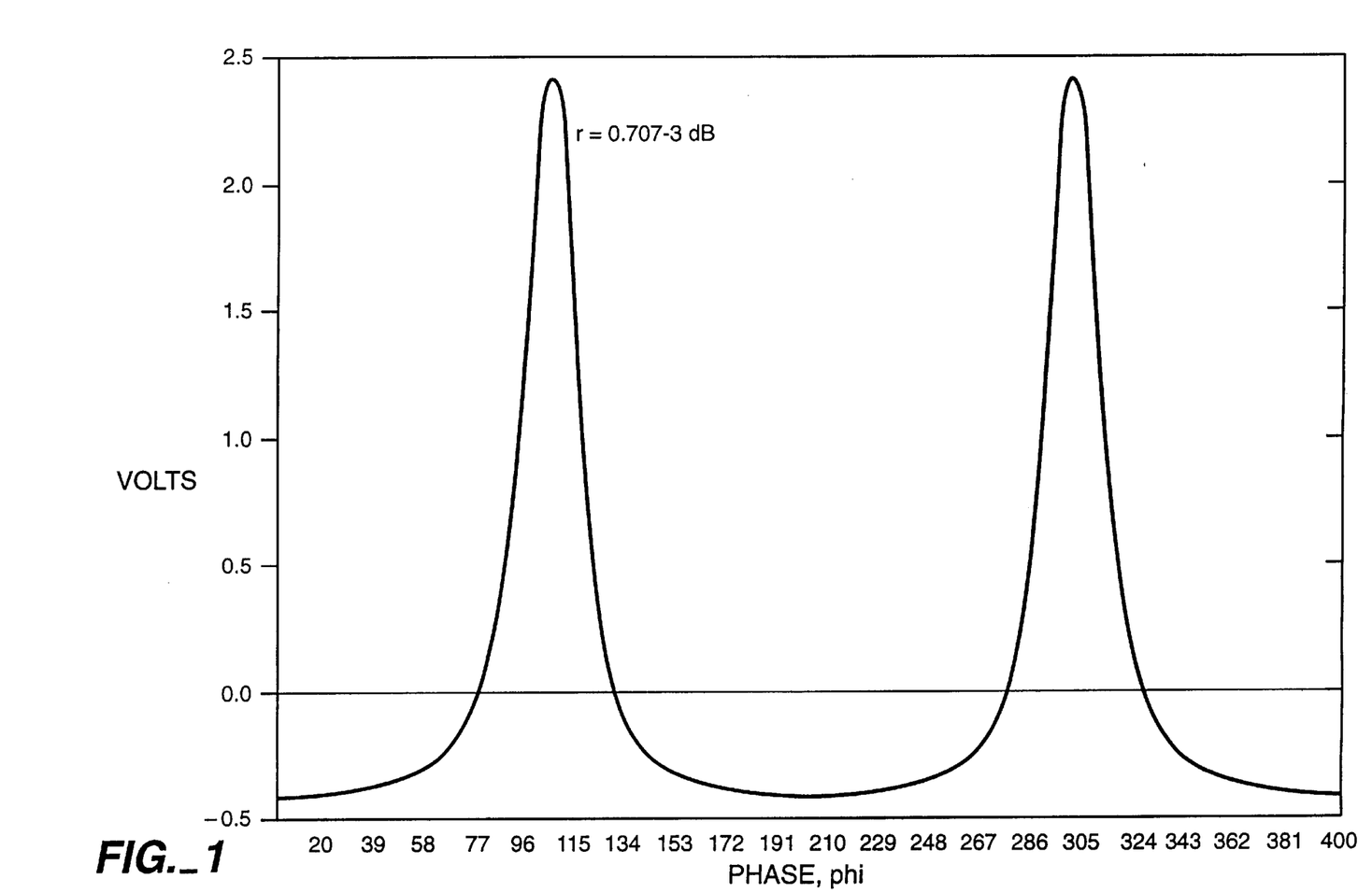
FIG. 1 is a plot of the function $g(r,\phi)$ factor of the instantaneous frequency deviation function $F(t)$ at the output of a transmitter signal combiner.

FIG. 1 shows a plot of the function $g(r, \phi)$ of Equation (4), when $r = 0.707$ ($r = -3$ dB) and for $\phi$ in the range $(0, 4\pi)$. This function consists of spikes with cusps between the spikes.

For the particular case where $m_d(t)$ and $m_s(t)$ are bit streams, $s_1$ and $s_x$, then F(t) of Equation (3) assumes an especially useful form with proper selection of system variables.

Figure 2:
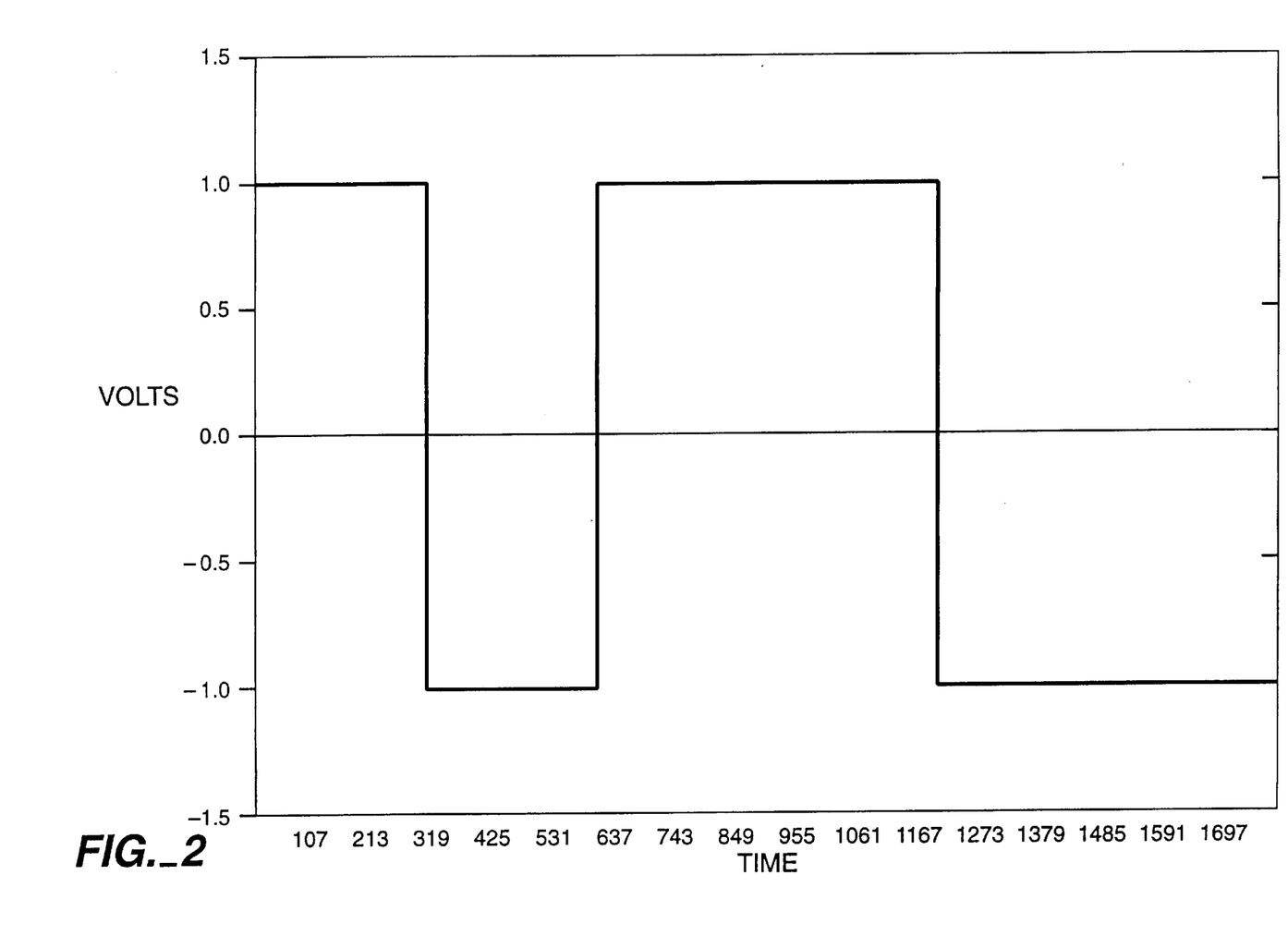
FIG. 2 is an example of an illustrative input bit stream $s_1$ to the transmitter.

FIG. 2 illustrates the two-level input bit sequence $s_1 = 1, 0, 1, 1, 0, 0$, which is applied to the dominant carrier.

Figure 3:
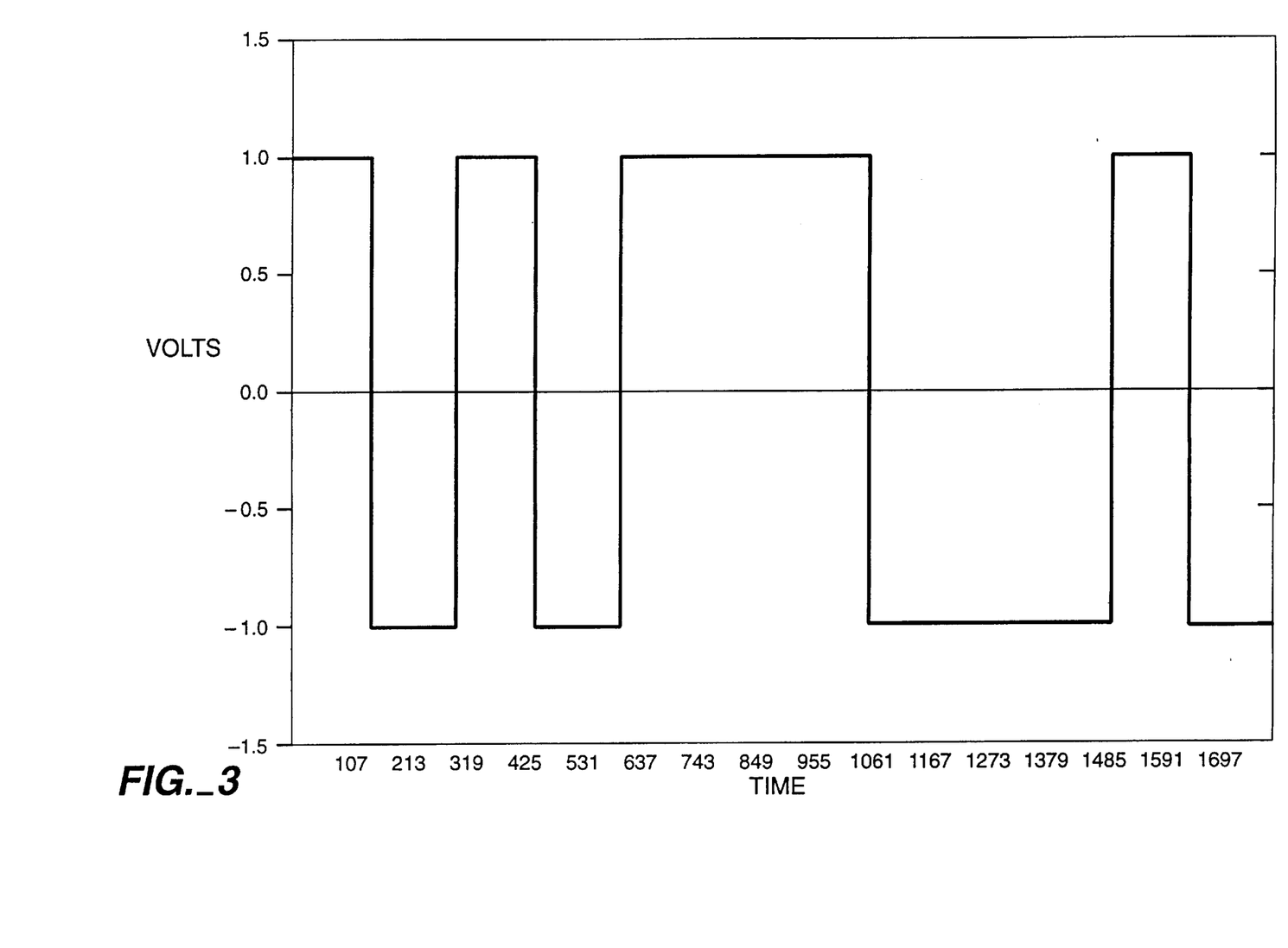
FIG. 3 is an example of another illustrative input bit stream $s_2$ to the transmitter.

FIG. 3 illustrates the two-level input bit sequence $s_2 = 1, 0, 1, 0, 1, 1, 1, 0, 0, 0, 1, 0$, which is applied to the subdominant carrier, where the bit rate of the stream carried by the subdominant carrier is twice that of the stream carried by the dominant carrier.

Figure 4:
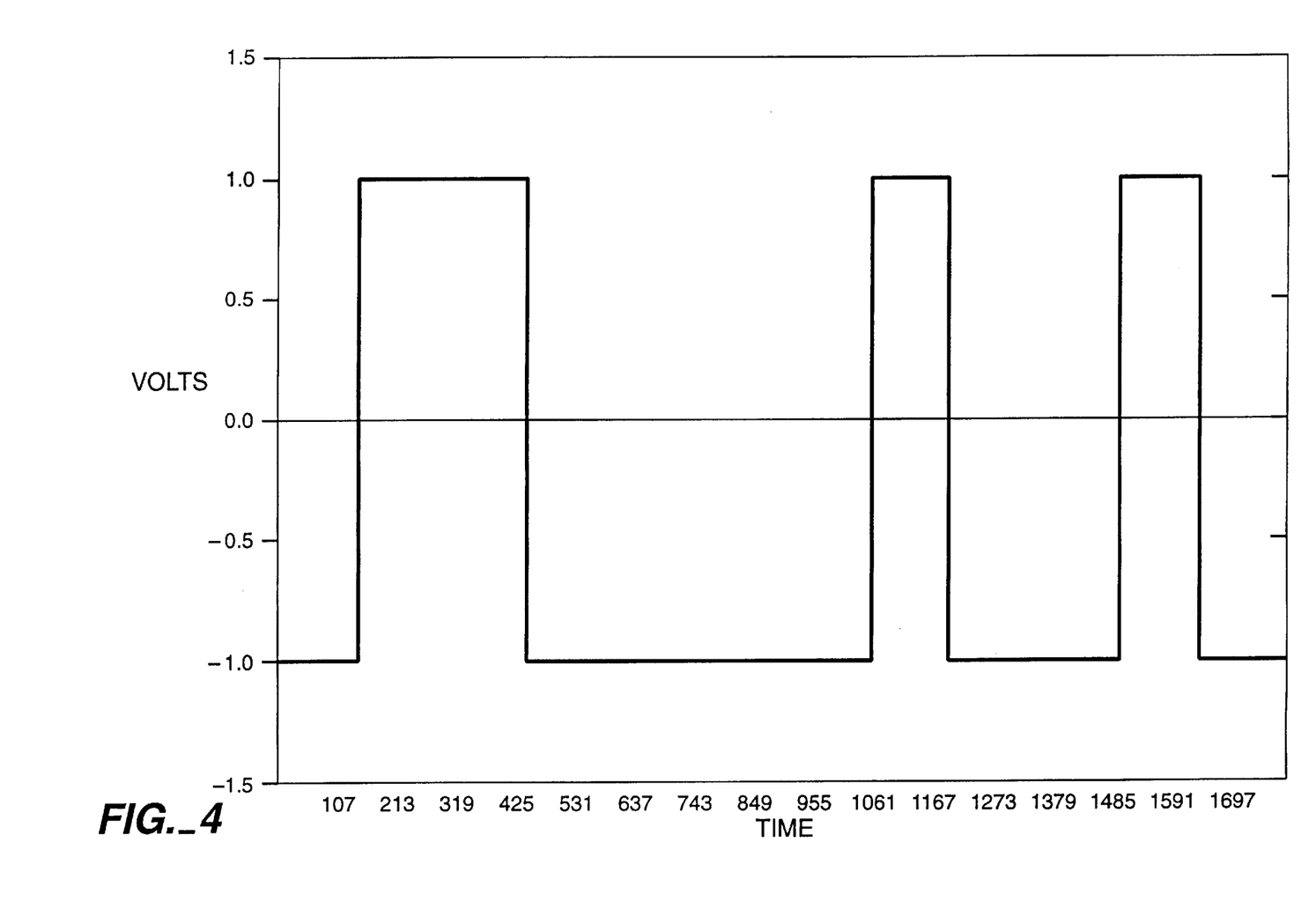
FIG. 4 is an example of a bit stream $s_x$ which is the exclusive—or combination of $s_1$ and $s_2$ of FIGS. 2 and 3.

FIG. 4 represents the result of combining these two sequences through use of an XOR logic function or gate to form $s_x$. The sequence $s_x$ resulting from the XOR operation is 0, 1, 1, 0, 0, 0, 0, 1, 0, 0, 1, 0. In a preferred embodiment of the invention, the output of the XOR function or gate is carried by the subdominant carrier rather than the original sequence. This permits easy and direct recovery of the original sequence because of the mapping effected by the circuitry used in the receiver.

In one form of the present invention, sequence $s_1$ is applied to the dominant carrier and sequence $s_2$ is applied to the subdominant carrier. The sequence $s_2$ is not recovered directly in the receiver and requires additional processing. An XOR combining of the two bit streams recovered in the receiver creates the sequence $s_2$. Use of the XOR operation is preferred in the transmitter since this avoids the need to synchronize the received bit streams in a receiver when using an XOR gate. Also, any error in either bit stream comprising the inputs to the XOR gate in a receiver creates an error in the output.

The bit streams represented by high and low voltage states frequency modulate the individual sinusoids to create frequency states of the resulting carriers.

Figure 5:
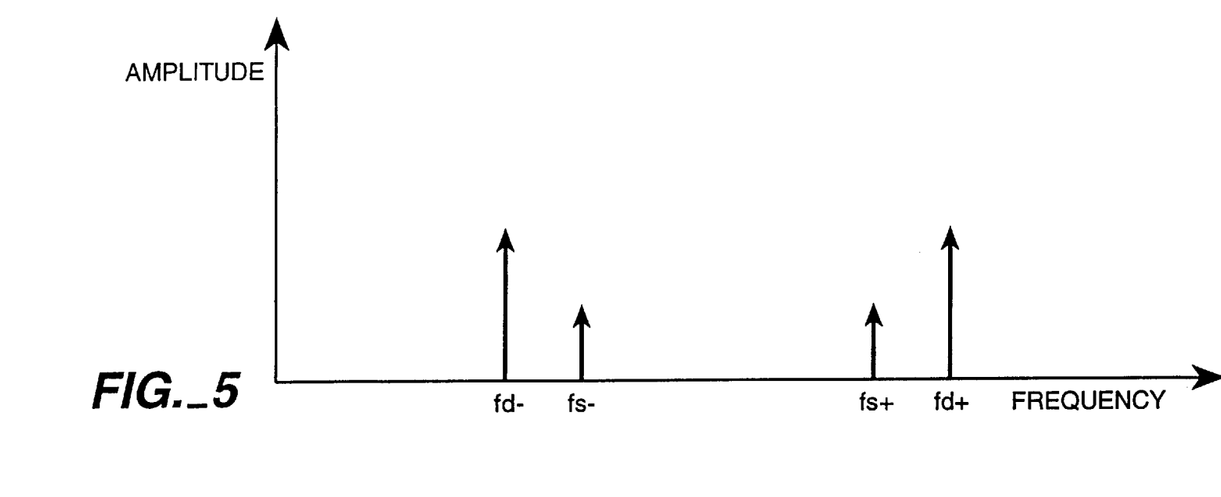
FIG. 5 is an example of the values of the peak frequency deviation of the dominant carrier and the subdominant carrier.

FIG. 5 is an example of the values of peak frequency deviation (frequency states) resulting from this modulation for both the dominant (long arrows) and subdominant (short arrows) carriers. In U.S. Pat. 5,541,959 the inventor of the present invention shows by equations and by use of a pinwheel diagram that peak frequency deviations placed like those of FIG. 5 are desirable because the spikes occurring at the output of any frequency demodulator have a polarity like that of the bit stream on the dominant carrier. This desired said polarity is also indicated by the second term on the right side of the equal sign of Equation 3. Spacing of the frequency states of FIG. 5 need not be uniform. The desirable condition is only that fs+<fd+ and fd-<fs-. In FIG. 5, the frequency of the unmodulated sinusoids are typically somewhere between fs- and fs+.

It is not necessary that the bit stream on the subdominant carrier have a rate greater than that on the dominant carrier. The rate of the bit stream on the dominant carrier can be greater than that on the subdominant carrier without affecting system operation. In this invention, it is only necessary that the bit stream rate on one carrier be an integer multiple of the bit stream rate on the other. The integer can be 1, 2, 3, etc.

Furthermore, it is not necessary that the bit streams experience abrupt transitions. The bit streams can experience filtering (shaping) with the filter (shaper) output then applied to the frequency modulator.

Figure 6:
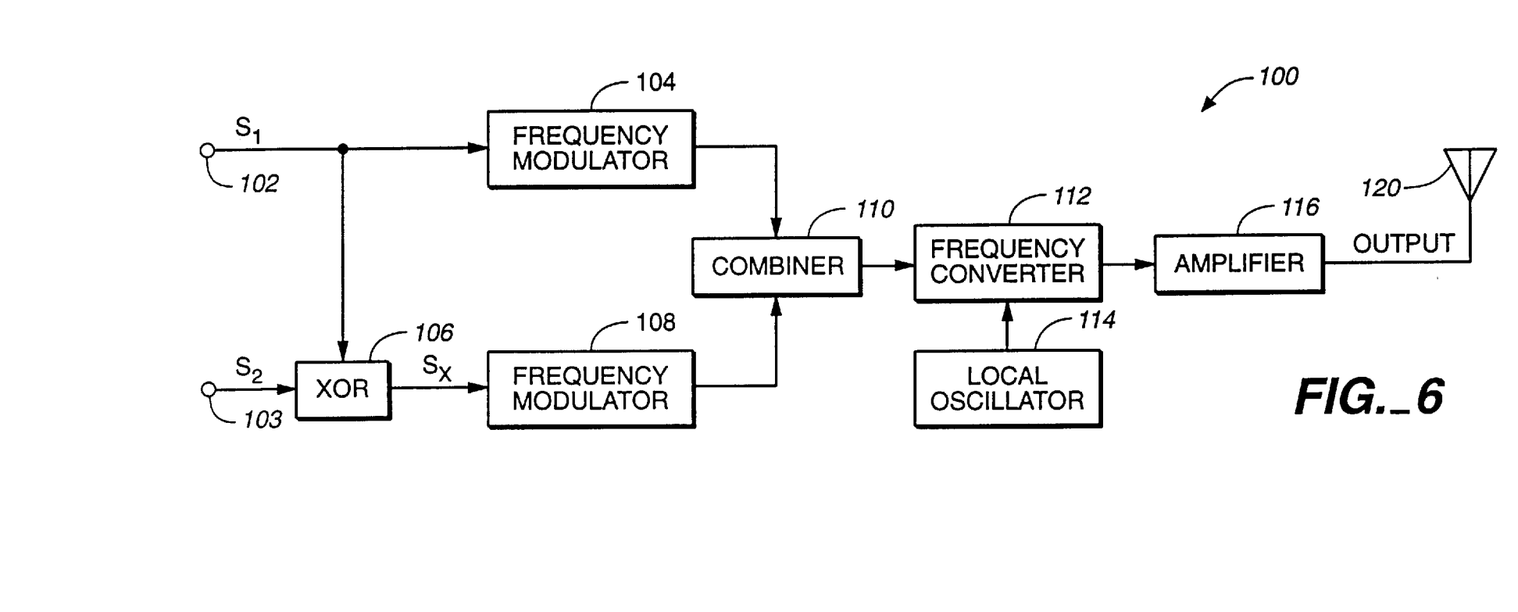
FIG. 6 is a block diagram of a transmitter according to the invention.

FIG. 6 shows a block diagram of a transmitter 100. An input bit stream $s_1$ is applied to an input terminal 102 at a rate $R_d$ bps. A second input bit stream $s_2$ is applied to an input terminal 103 at a rate $R_s$ bps. The input bit stream $s_1$ is applied to an input terminal of a frequency modulator 104, which is one of a variety of frequency modulators, such as, for example, a Valpey Fisher VF940 series modulator. The input bit stream $s_1$ frequency modulates a dominant carrier and creates a dominant frequency-modulated sinusoid signal at the output of the frequency modulator 104.

The input bit stream $s_1$ is also applied to an input terminal of an XOR logic gate or function 106 having as a second input the other independent bit stream $s_2$. The output of the XOR gate is a bit stream at a rate which is the greater of $R_d$ or $R_s$ bps and which is applied to a frequency modulator 108, such as the VF940 series, to create a frequency-modulated sinusoid. The amplitude of the frequency-modulated sinusoid from the modulator 108 is then adjusted, with a potentiometer or other means of voltage level control, to be less than that of the dominant frequency-modulated sinusoid from the frequency modulator 104. The two resulting sinusoids are then summed or combined in a summer or combiner 110 to create a single power-multiplexed carrier. The output signal of the combiner 110 has an instantaneous frequency deviation F(t) as represented by Equation (3).

The single carrier is then converted in frequency using a frequency converter 112 and local oscillator 114. The frequency converted signal is then amplified in an amplifier 116 and applied to an antenna 120 for broadcast in a manner suitable for each particular application.

Figure 7A:
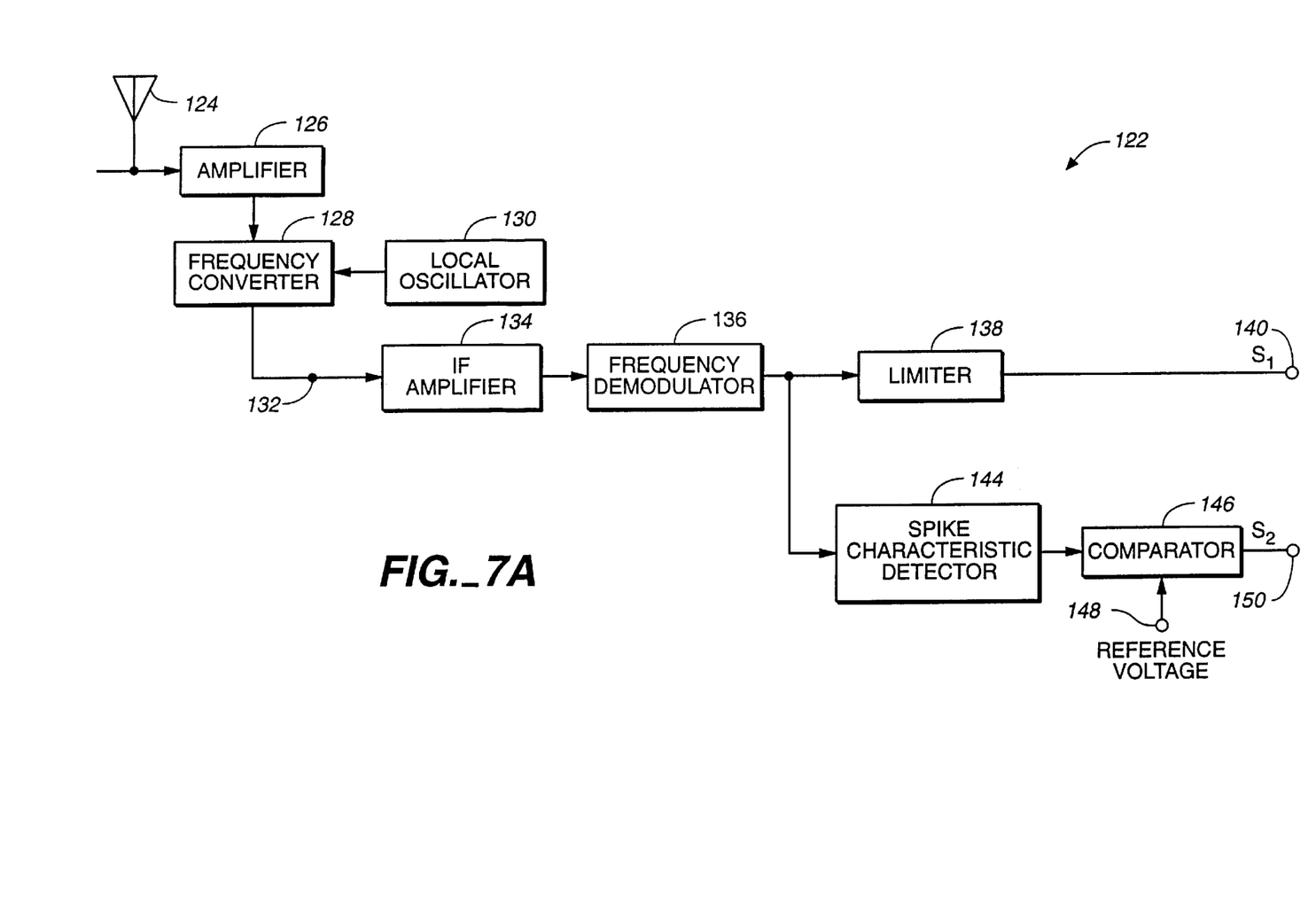
FIG. 7A is a block diagram of a receiver having a spike characteristic detector according to the invention.

FIG. 7A shows a block diagram or signal flow diagram of a receiver 122, which is companion to the transmitter 100 of FIG. 6. The receiver includes a receiving antenna 124 for receiving the broadcast signal from the transmitter antenna 120. A low-noise amplifier 126 has an input terminal coupled to the antenna 124 and has an output terminal coupled to one input terminal of a frequency converter 128. Another input terminal of the frequency converter 128 is coupled to the output terminal of a local oscillator 130. The frequency converter 128 down converts the input frequencies to an intermediate IF frequency range. An output terminal of the frequency converter is coupled to an input terminal 132 of an IF amplifier 134.

A broadcast signal is received by the antenna 124, amplified, and converted in frequency, as in any RF receiver design to prepare the received signal for demodulation. A frequency demodulator 136 is any suitable frequency demodulator, such as, for example, a Signetics NE604 integrated circuit. The input signal to the demodulator 136 from the IF amplifier 134 has an instantaneous frequency deviation represented by Equation (3).

Figure 8:
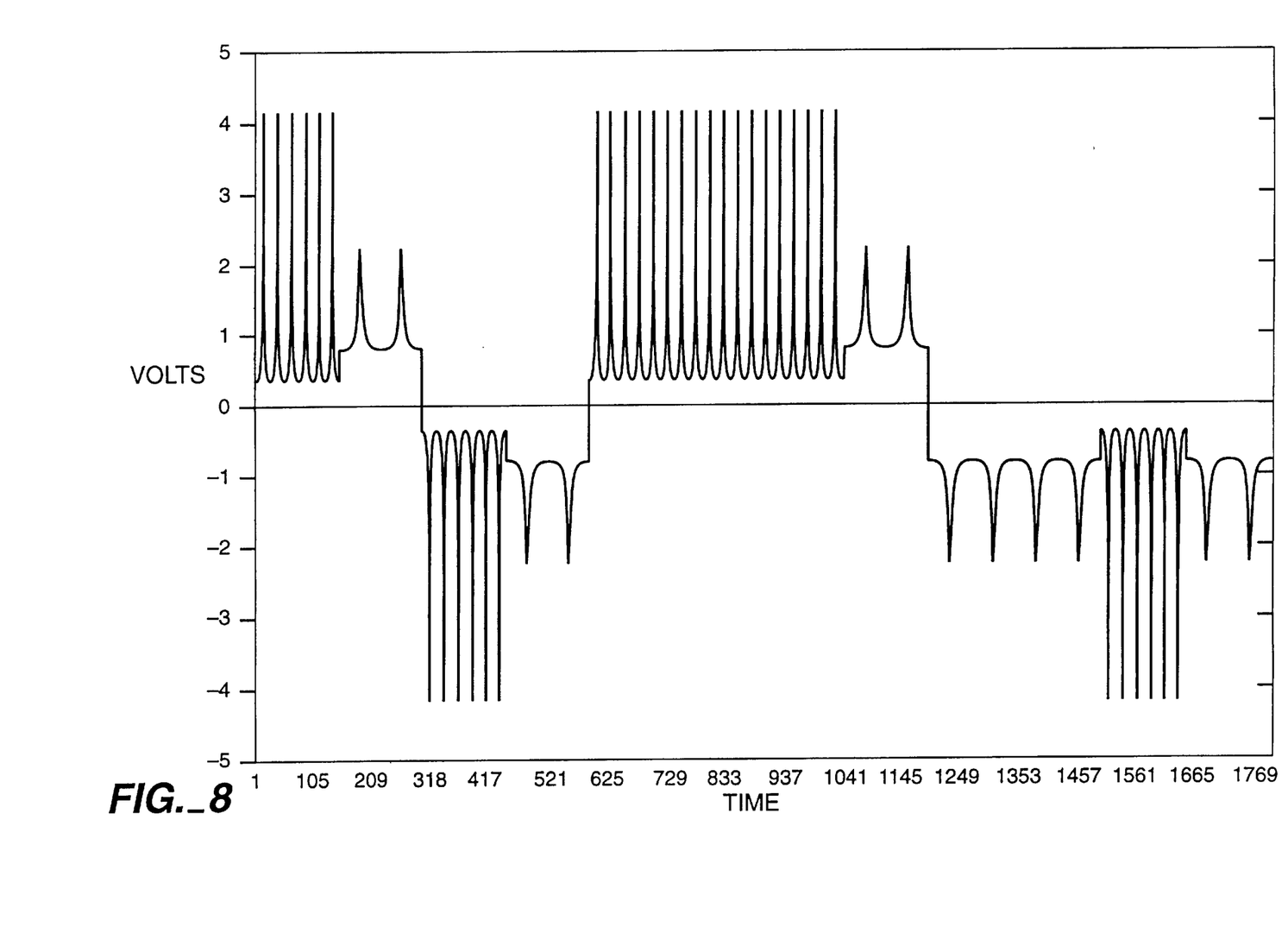
FIG. 8 is an illustrative example of the signal output of any type of frequency demodulator for the illustrative bit streams of FIGS. 2 and 4.

FIG. 8 shows the output signal of the frequency demodulator 136 for the example in this invention illustrated in connection with the input data streams of FIGS. 2, 3, and 4. The output signal consists of the bit stream on the dominant carrier on which are superimposed voltages spikes. The voltage spikes have amplitude and frequency, or rate, characteristics as suggested by Equations (3) and (4), where the function $g(r, \phi)$ is the source of the spikes. The peak voltage value of the spikes is related to the difference of the values of the bits on the two carriers as given by Equation (3). Data is encoded in the spikes.

Because of the XOR operation on the independent bit streams in the transmitter, the bit on the subdominant carrier is determined directly by measuring the peak voltage value of said spikes. In this manner, the independent bit streams $s_1$ and $s_2$ in the transmitter can be recovered from the output of any frequency demodulator.

Referring again to FIG. 7A, the bit on the dominant carrier can be recovered by passing the output of the frequency demodulator to a hard limiter 138 which functions as an analog-to-digital converter (ADC) since the limiter output is 'high' when its input voltage is >0 (or some other predetermined value) and 'low' when its input voltage is <0. Inspection of FIG. 8 and comparison with FIG. 2 establishes that the output of the hard limiter 138 provided on output terminal 140 is the bit stream $s_1$ originally carried by the dominant sinusoid.

The series connection of any frequency demodulator and a hard limiter is commonly used to recover bit streams from single frequency modulated carriers. Consequently, a feature of this invention is operation as an ordinary single carrier per channel system or as a two carrier per channel system with no change in receiver design or function. A switch in the transmitter can select the mode of operation.

Observation of Equation (3) and FIG. 8 shows that when the input data signals are different, more beat spikes are obtained at greater amplitude. When the input data signals are the same, fewer beat spikes are obtained at smaller amplitude. Therefore, measurement of either the rate of the voltage spikes or the peak value of the voltage spikes will obtain the bit stream on the weaker carrier.

Figure 7B:
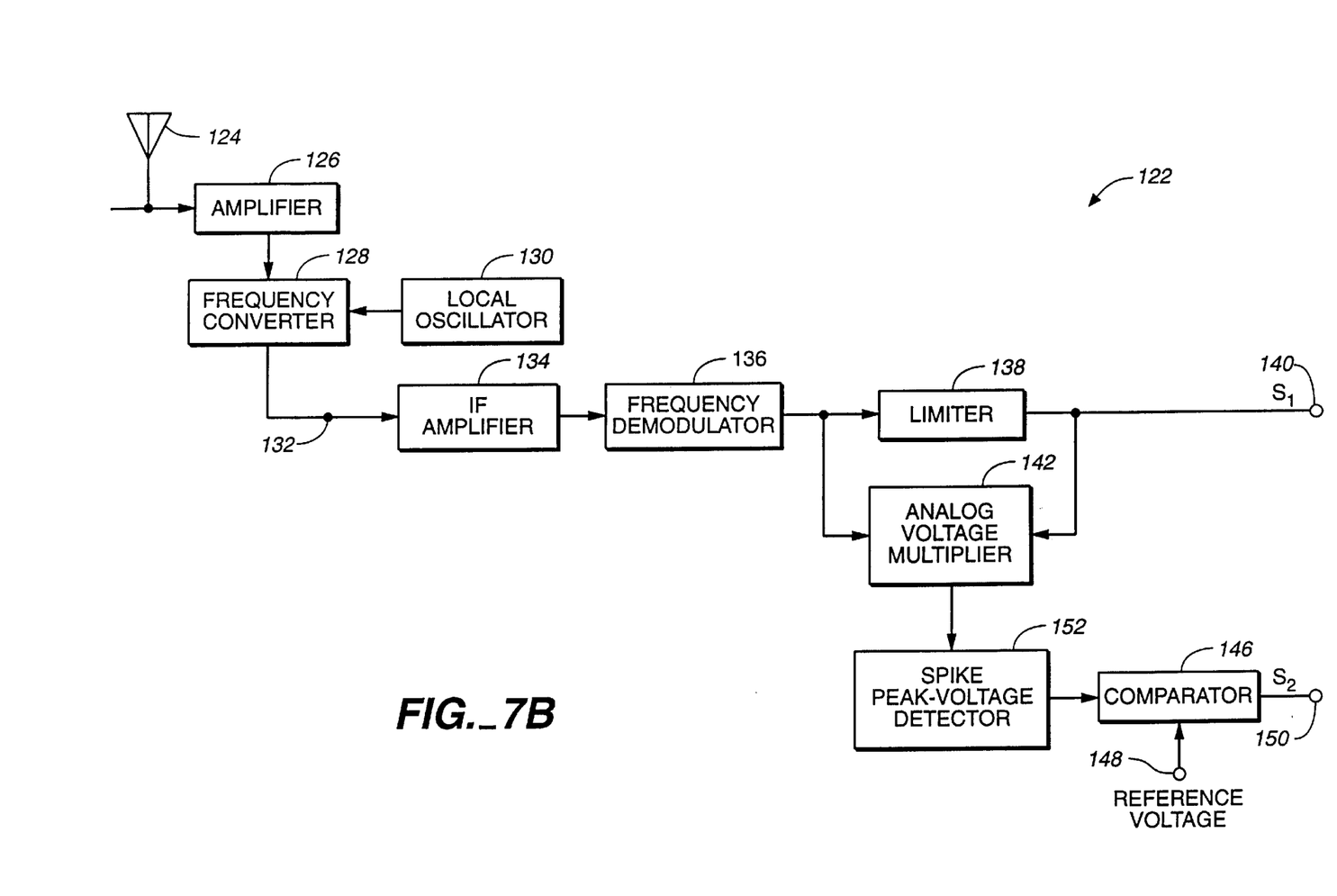
FIG. 7B is a block diagram of a receiver having a spike peak-voltage characteristic detector according to the invention.
Figure 7C:
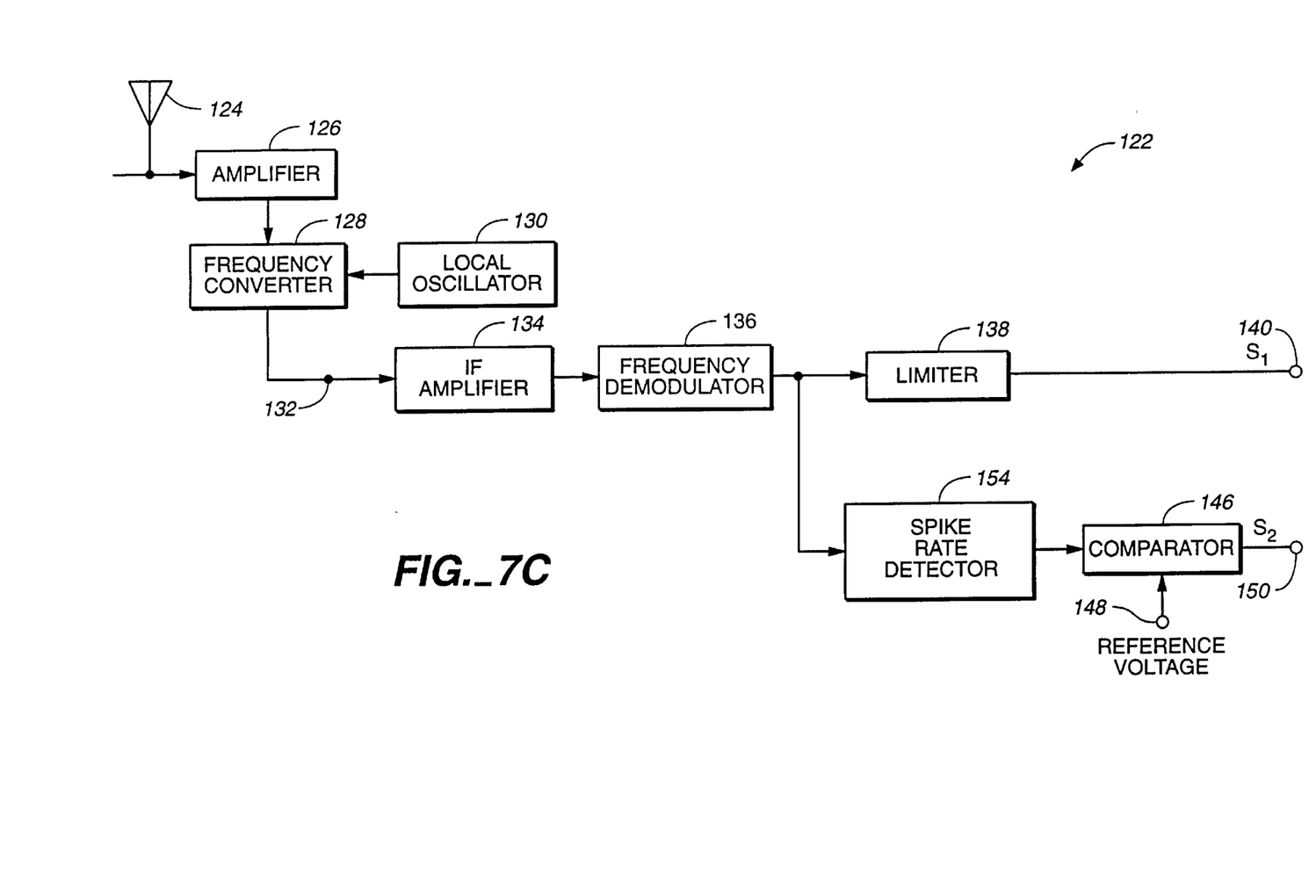
FIG. 7C is a block diagram of a receiver having a spike rate detector according to the invention.

FIG. 7A is a block diagram of a receiver having a generic spike characteristic detector 144 according to the invention. FIG. 7B is a block diagram of a receiver having a spike peak-voltage characteristic detector 152 according to the invention. FIG. 7C is a block diagram of a receiver having a spike rate characteristic detector 154 according to the invention.

With reference to the signal wave form of FIG. 8, the peak voltage value of the spikes superimposed on the message of the dominant carrier can be determined in a variety of ways. In one preferred embodiment shown in FIG. 7A, the output of the frequency demodulator 136 is full-wave rectified to create a unipolar voltage.

Figure 9:
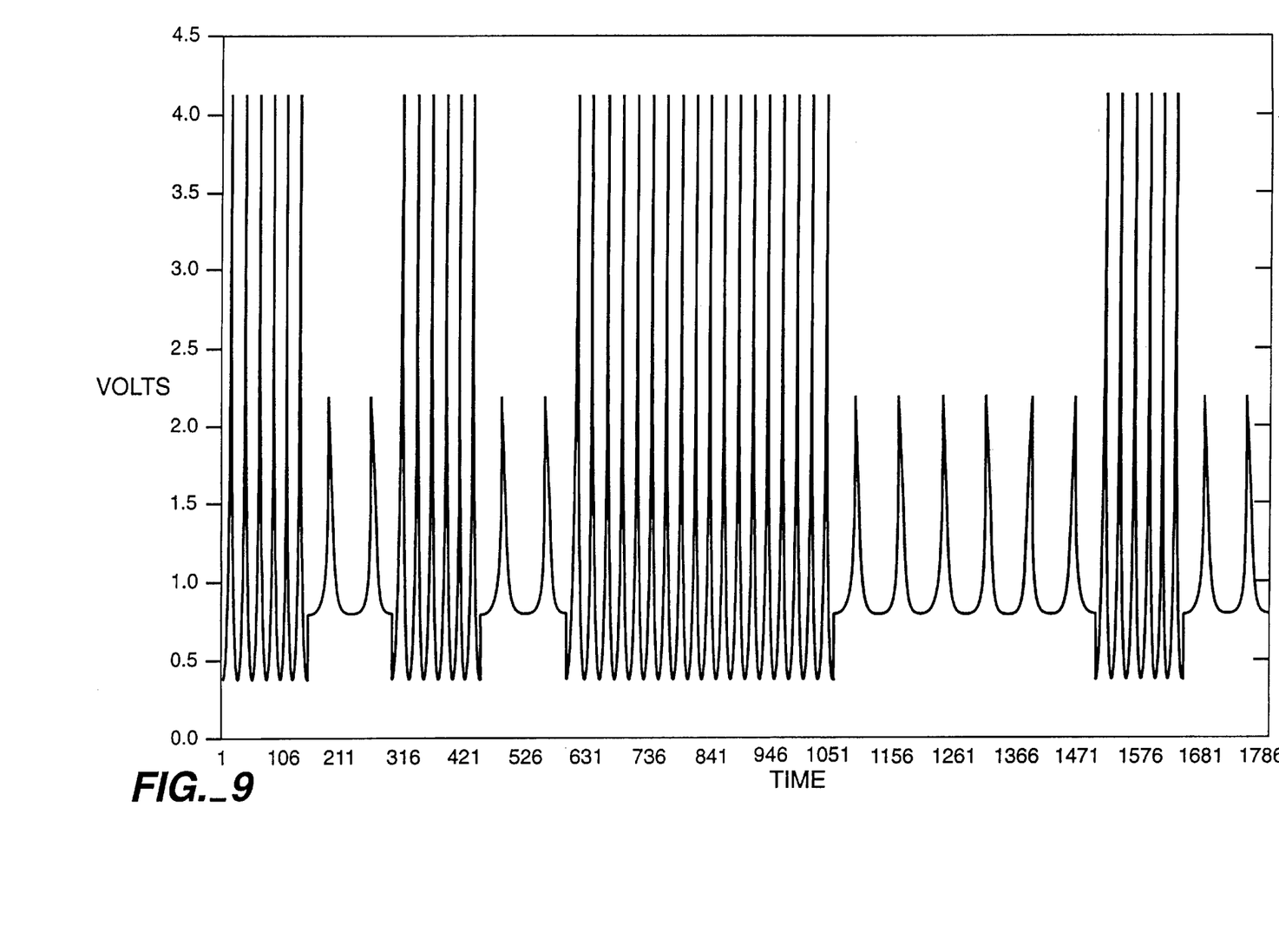
FIG. 9 is an illustrative example of the signal output of a full-wave rectifier having as an input the output of the frequency demodulator of FIG. 8.

FIG. 9 shows such a full-wave rectified version. One preferred embodiment of a full-wave rectifier includes an analog voltage multiplier 142 such as the Analog Devices AD734 integrated circuit, having the limiter 138 output signal as one input and the output of the frequency demodulator 136 as the other input.

FIG. 7B is a block diagram of a receiver having a spike peak-voltage characteristic detector according to the invention. A common peak voltage measuring circuit used in AM radios is an envelope detector. The voltage of FIG. 9 when applied to an envelope detector, or peak voltage detector 152, creates two distinct voltage levels which can be discerned and converted to digital form by a comparator 146, which has a reference voltage applied to a terminal 148. The reference voltage has a value which approximately equals the mean of the two peak values of the voltage of FIG. 9. The output of the peak voltage measuring, or detecting, circuit is a voltage signal which follows the peak values of the spikes on the signal shown in FIG. 9. A digital version of a peak detector for detecting the spikes of FIG. 9 includes comparing a present sample value of the wave form of FIG. 9 with a previous sample value to determine if a local peak has occurred in the wave form.

The output of the comparator on terminal 150 is the other independent bit stream $s_2$ which can be verified by comparing the peak values of the voltage of FIG. 9 with the second bit stream $s_2$ in FIG. 3. Other embodiments of peak voltage measuring circuits and comparators can be used in this application to recover bit stream $s_2$.

FIG. 7C is a block diagram of a receiver having a spike rate characteristic detector 154 for obtaining transmitted data according to the invention.

A feature of this invention is the absence of any adjustments in receiver operation. The reference or threshold voltage used to distinguish peak amplitude or rate of spike voltages is determined from knowledge of the peak frequency deviation of each of the two carriers and that reference voltage is then set prior to receiver operation.

Any edge jitter occurring in the recovered voltages representing the independent bit streams $s_1$ and $s_2$ can be removed by recovering a clock from the output of the hard limiter. Said clock can be used with usual digital circuitry to create clocked wave forms $s_1$ and $s_2$ like those used in the transmitter.

In various alternative embodiments of the invention, all or parts of the transmitter functions of FIG. 6 as well as all or parts of the receiver functions of FIG. 7A, 7B, 7C for recovering the two independent input bit streams are obtained using computational routines provided by software in a programmed computer. These routines would emulate the receiver and transmitters functions as shown in FIGS. 6 and 7A, 7B, 7C. The organization and structure of such routines use FIGS. 6 and 7A, 7B, 7C as flow charts for signal processing. Each of the functions of frequency demodulation, limiting, peak voltage detection, and voltage comparison is achieved using a variety of algorithms for each of such functions.

If necessary, an analog-to-digital- converter (ADC) can be used to interface a continuous input voltage signal to computer code words processed by such routines. Similarly, a digital-to-analog converter (DAC)can be used to interface computer code words to a continuous output voltage.

Alternatively, a computer implemented routine can operate on the instantaneous frequency deviation function F(t) to obtain $m_d(t)$ and $m_s(t)$ directly as follows: Sample F(t) at a rate sufficiently greater than the data rate of the input bits transported by the two carriers. Let $F(t_x)$ be the value of the sample of F(t) at time $t=t_x$, where x is any sample If $F(t_x)>0$, store and read $m_d(tx)$ as a constant=V. If $F(t_x)<0$, store and read $m_d(t_x)$ as −V. This procedure recovers samples of the message on the dominant carrier. If the values of either +V or −V are held between samples, then a continuous estimate of $m_d(t)$ is obtained with a one bit DAC.

To obtain $m_s(t)$: Provide samples of the maximum values of F(t) at sample bit intervals which occur at a rate greater than the bit intervals of $m_s(t)$ and $m_d(t)$. Compare the samples with a threshold voltage $V_T$. If the maximum value of the sample of $F(t)<V_T$ for a particular bit interval, then store and read $m_s(t)$ as $m_d(t)$ for that bit interval. Otherwise, store and read $m_s(t)$ as $-m_d(t)$ for that bit interval. In this manner, a continuous estimate of $m_s(t)$ is obtained with a one-bit DAC.

While the present invention has been particularly shown and described with respect to a certain preferred embodiment thereof, it should be readily apparent to those of ordinary skill in the art that various changes and modifications in form and detail may be made without departing from the spirit and scope of the invention as set forth in the appended claims. In particular, for example, other circuit configurations can be used to extract from the output of any frequency demodulator voltages necessary to create $s_1$ and $s_2$. Sampling and digital signal processing circuits can be used to accomplish the required result as described in the invention. Also, circuitry may be simplified when other prior information about $s_1$ and/or $s_2$ is known. The principles of the invention apply to bit streams having unrelated clock rates. The invention can be used when the bit streams are filtered or shaped prior to carrier modulation. Power multiplexing as described herein can be applied to phase shift keying (PSK) methods of carrier modulation. For example, quadrature PSK (QPSK) as commonly practiced is a special case of power multiplexing whereby the two carriers are related and have equal power. The invention illustratively disclosed herein may be practiced in the absence of any element which is not specifically disclosed herein. The invention is not limited to the embodiments disclosed herein and may be practiced using other techniques such as, for example, DSP or software implementations of circuit or system functions.

I claim:

1. A system for transmitting and receiving independent bit streams from each of two co-channel frequency-modulated carriers, comprising:
   a transmitter including:
      a first system input terminal for receiving a first input bit stream;
      a first frequency modulator having an input terminal coupled to the first system input terminal for receiving the first input bit stream and having an output terminal at which is provided a first sinusoidal signal which is frequency modulated by the first input bit stream;
      a second system input terminal for receiving a second input bit stream;
      a second frequency modulator having an input terminal coupled to the second system input terminal for receiving the second input bit stream and having an output terminal at which is provided a second sinusoidal signal which is frequency modulated by the second input bit stream;
      wherein the power of the first sinusoidal signal is greater than the power of the second sinusoidal signal;
      a signal combiner having a first input terminal coupled to the output terminal of the first frequency modulator, the combiner having a second input terminal coupled to the output terminal of the second frequency modulator, and the combiner having an output terminal at which is provided an output signal which is the sum of the output signal of the first frequency modulator and the output signal of the second frequency modulator;
   a receiver, including:
      a frequency demodulator having an input terminal for receiving a replica of the output signal of the signal combiner, the frequency demodulator having an output terminal at which is provided a frequency-demodulated signal which is comprised of the bit stream on the stronger carrier on which are superimposed voltage spikes wherein said voltage spikes have characteristics which include amplitude characteristics and rate characteristics;
      a limiter having an input terminal coupled to the output terminal of the frequency demodulator, said limiter having an output terminal at which is provided an output signal corresponding to the first input bit stream;
      a spike characteristic detector having an input terminal coupled to the output terminal of the frequency demodulator for receiving the frequency-demodulated signal, said spike characteristic detector having an output terminal at which is provided output signal levels corresponding to the characteristics of said voltage spikes;
      a comparator having a first input terminal with a reference voltage coupled thereto, said comparator having a second terminal coupled to the output terminal of the spike characteristic detector, said comparator having an output terminal at which is provided an output signal corresponding to the second input bit stream;
   wherein the two independent bit streams are recovered from a single composite power multiplexed sinusoidal carrier.

2. The system of claim 1 wherein the spike characteristic detector is a peak voltage detector for the voltage spikes of the frequency-demodulated signal.

3. The system of claim 2 wherein the peak voltage detector includes a full-wave rectifier having an analog voltage multiplier having one input terminal coupled to the output terminal of the frequency demodulator and having another input terminal coupled to the output terminal of the limiter, said analog voltage multiplier having an output terminal.

4. The system of claim 1 wherein the spike characteristic detector is a rate detector for the voltage spikes of the frequency-demodulated signal.

5. The system of claim 1 including an exclusive—or (XOR) having a first input terminal coupled to the first system input terminal for receiving the first system input bit stream, the exclusive—or (XOR) having a second input terminal coupled to the second system input terminal for receiving the second system input bit stream, wherein the exclusive—or (XOR) has an output terminal at which is provided an output signal which is the exclusive—or combination of the first and the second system input bit streams.

6. The system of claim 1 wherein the input bit streams are clocked from a common timing reference signal in the transmitter.

7. The system of claim 6 wherein said first and second input bit streams have data rates which are integer multiples of each other.

8. The system of claim 1 wherein said system is a wireless communication system, wherein:
   the transmitter includes;
      a frequency converter having an input terminal coupled to the output terminal of the signal combiner and having an output terminal;
      a power amplifier having an input terminal coupled to the output terminal of the frequency converter and having an output terminal; and a transmitting antenna coupled to the output terminal of the power amplifier for transmitting a broadcast signal; and the receiver includes;
  a receiving antenna for receiving the broadcast signal;
  an amplifier having an input terminal coupled to the antenna and having an output terminal;
  a frequency converter having an input terminal coupled to the output terminal of the amplifier and having an output terminal; and
  an IF amplifier having an input terminal coupled to the output terminal of the frequency converter and having an output terminal coupled to the input terminal of the frequency demodulator.

9. A system for transmitting and receiving independent bit streams from each of two co-channel frequency-modulated carriers, comprising:

a transmitter including:
  a first system input terminal for receiving a first input bit stream;
  a first frequency modulator having an input terminal coupled to the first system input terminal for receiving the first input bit stream and having an output terminal at which is provided a first sinusoidal signal which is frequency modulated by the first input bit stream;
  a second system input terminal for receiving a second input bit stream;
  a second frequency modulator having an input terminal coupled to the second system input terminal for receiving the second input bit stream and having an output terminal at which is provided a second sinusoidal signal which is frequency modulated by the second input bit stream;
  wherein the power of the first sinusoidal signal is greater than the power of the second sinusoidal signal;
  a signal combiner having a first input terminal coupled to the output terminal of the first frequency modulator, the combiner having a second input terminal coupled to the output terminal of the second frequency modulator, and the combiner having an output terminal at which is provided an output signal which is the sum, or additive combination, of the output signal of the first frequency modulator and the output signal of the second frequency modulator;
  wherein the additive combination is a sinusoid with an instantaneous frequency $F(t)=m_d(t)+r[m_d(t)-m_s(t)][g(r,\phi)]$, where $r=A_s/A_d$, $A_s$=peak amplitude of a weaker subdominant carrier, $A_d$=peak amplitude of a stronger dominant carrier, $\phi(t)=\theta_d(t)-\theta_s(t)$, $\theta_d(t)$=phase variation of the dominant carrier due to its message, $\theta_s(t)$=phase variation of the subdominant carrier due to its message, $m_d(t)=(\frac{1}{2}\pi)[d\theta_d(t)/dt]$=message carried by the dominant sinusoid, $m_s(t)=(\frac{1}{2}\pi)[d\theta_s(t)/dt]$=message carried by the subdominant sinusoid, $g(r,\phi)=-\{r\cdot[r+\cos\phi(t)]/[1+r^2+2r\cos\phi(t)]\}$;

a receiver, including:
  a frequency demodulator having an input terminal for receiving a replica of the output signal of the signal combiner, the frequency demodulator having an output terminal at which is provided a frequency-demodulated signal;
  a limiter having an input terminal coupled to the output terminal of the frequency demodulator, said limiter having an output terminal at which is provided an output signal corresponding to the first input bit stream, $m_d(t)$;
  a spike characteristic detector having an input terminal coupled to the output terminal of the frequency demodulator for receiving the frequency-demodulated signal, said spike characteristic detector having an output terminal at which is provided output signal levels corresponding to the characteristics of said voltage spikes;
  a comparator having a first input terminal with a reference voltage coupled thereto, said comparator having a second terminal coupled to the output terminal of the spike characteristic detector, said comparator having an output terminal at which is provided an output signal corresponding to the second input bit stream;

wherein the two independent bit streams are recovered from the single composite power multiplexed sinusoidal carrier and wherein the peak values of the characteristics of the characteristics of the voltage superimposed on the bit stream carried by the dominant sinusoid are distinguished with a spike characteristic detector.

10. The system of claim 9 wherein said system is a wireless communication system, wherein:

the transmitter includes;
  a frequency converter having an input terminal coupled to the output terminal of the signal combiner and having an output terminal;
  a power amplifier having an input terminal coupled to the output terminal of the frequency converter and having an output terminal; and
  a transmitting antenna coupled to the output terminal of the power amplifier for transmitting a broadcast signal; and the receiver includes;
  a receiving antenna for receiving the broadcast signal;
  an amplifier having an input terminal coupled to the antenna and having an output terminal;
  a frequency converter having an input terminal coupled to the output terminal of the amplifier and having an output terminal; and
  an IF amplifier having an input terminal coupled to the output terminal of the frequency converter and having an output terminal coupled to the input terminal of the frequency demodulator.

11. The system of claim 9 wherein the spike characteristic detector is a peak voltage detector of the voltage spikes of the frequency-demodulated signal.

12. The system of claim 11 wherein the peak voltage detector includes a full-wave rectifier having an analog voltage multiplier having one input terminal coupled to the output terminal of the frequency demodulator and having another input terminal coupled to the output terminal of the limiter, said analog voltage multiplier having an output terminal.

13. The system of claim 9 wherein the spike characteristic detector is a rate detector of the voltage spikes of the frequency-demodulated signal.

14. The system of claim 9 including an exclusive—or (XOR) having a first input terminal coupled to the first system input terminal for receiving the first system input bit stream, the exclusive—or (XOR) having a second input terminal coupled to the second system input terminal for receiving the second system input bit stream, wherein the exclusive—or (XOR) has an output terminal at which is provided an output signal which is the exclusive—or combination of the first and the second system input bit streams.

15. The system of claim 9 wherein the input bit streams are clocked from a common timing reference signal in the transmitter.

16. The system of claim 9 wherein said first and second input bit streams have data rates which are integer multiples of each other.

17. A method for transmitting and receiving independent bit streams from each of two co-channel frequency-modulated carriers, comprising the steps of:

frequency-modulating a first sinusoidal signal with a first input bit stream;

frequency-modulating a second sinusoidal signal with a second input bit stream;

wherein the power of the first sinusoidal signal is greater than the power of the second sinusoidal signal;

combining the output signal of the first frequency modulator and the output signal of the second frequency modulator to provide a combined transmitter signal;

frequency demodulating a replica of the combined transmitter signal to provide a frequency-demodulated signal, wherein the frequency-demodulated signal is comprised of the bit stream on the stronger carrier on which are superimposed voltage spikes wherein said voltage spikes have characteristics which include amplitude characteristics and rate characteristics;;

limiting the demodulated signal to provide an output signal corresponding to the first input bit stream;

detecting the spike characteristics of the frequency-demodulated signal to provide output signal levels corresponding to the characteristics of said voltage spikes;

comparing the output signal levels corresponding to the characteristics of said voltage spikes to a reference signal in a comparator to provide an output signal corresponding to the second input bit stream;

wherein the two independent bit streams are recovered from the single composite power multiplexed sinusoidal carrier.

18. The method of claim 17 wherein the step of detecting the spike characteristics includes peak-voltage detecting the voltage spikes of the frequency-demodulated signal.

19. The method of claim 18 wherein the step of peak-voltage detecting includes full-wave rectifying the frequency-demodulated signal.

20. The method of claim 17 wherein the step of detecting the spike characteristics includes rate detecting the voltage spikes of the frequency-demodulated signal.

21. The method of claim 17 including the step of combining the first system input bit stream and the second system input bit stream in an exclusive—or (XOR) to provide an output signal which is the exclusive—or combination of the first and the second system input bit streams and which frequency modulates the second sinusoidal signal.

22. The method of claim 19 wherein the step of full-wave rectifying includes multiplying the output signal of the frequency demodulator by the output signal of the limiter to provide a full-wave rectified signal.

23. The method of claim 17 wherein the input bit streams are clocked from a common timing reference signal in the transmitter.

24. The method of claim 23 wherein said first and second input bit streams have data rates which are integer multiples of each other.

25. The method of claim 17 further including the steps of:

frequency converting the combined transmitter signal to provide a frequency-converted combined signal;

broadcasting the frequency-converted combined signal with a transmitting antenna;

receiving the frequency-converted broadcast combined signal with a receiving antenna;

amplifying the received combined signal with an amplifier; and frequency-converting the amplified, received combined signal and amplifying the frequency-converted signal with an IF amplifier prior to frequency demodulation.

* * * * *